(12) United States Patent
Bent et al.

(10) Patent No.: US 10,135,924 B2
(45) Date of Patent: Nov. 20, 2018

(54) COMPUTING ERASURE METADATA AND DATA LAYOUT PRIOR TO STORAGE USING A PROCESSING PLATFORM

(71) Applicant: EMC IP Holding Company LLC, Hopkinton, MA (US)

(72) Inventors: John M. Bent, Los Alamos, NM (US); Sorin Faibish, Newton, MA (US); Dennis P. J. Ting, Groton, MA (US); Sasan Teymouri, Saratoga, CA (US); James M. Pedone, Jr., West Boylston, MA (US); Gary Grider, Los Alamos, NM (US)

(73) Assignees: EMC IP Holding Company LLC, Hopkinton, MA (US); Los Alamos National Security, LLC, Los Alamos, NM (US)

(*) Notice: Subject to any disclaimer, the term of this patent is extended or adjusted under 35 U.S.C. 154(b) by 514 days.

(21) Appl. No.: 14/751,372

(22) Filed: Jun. 26, 2015

(65) Prior Publication Data

US 2016/0381138 A1   Dec. 29, 2016

(51) Int. Cl.
*G06F 3/06* (2006.01)
*H04L 29/08* (2006.01)
*G06F 15/167* (2006.01)

(52) U.S. Cl.
CPC ........ *H04L 67/1097* (2013.01); *G06F 3/0611* (2013.01); *G06F 15/167* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 8,972,465 B1* | 3/2015 | Faibish | G06F 17/30091 707/822 |
| 2008/0109526 A1* | 5/2008 | Subramanian | H04L 67/1097 709/212 |

(Continued)

OTHER PUBLICATIONS

Bent et al., "Jitter-Free Co-Processing on a Prototype Exascale Storage Stack", Mass Storage Systems and Technologies (MSST), IEEE 28th Symposium, Sandiego, CA; pp. 1-5 (2012).

(Continued)

*Primary Examiner* — Brian R Peugh
(74) *Attorney, Agent, or Firm* — Ryan, Mason & Lewis, LLP

(57) ABSTRACT

Techniques are provided for computing data and metadata layout prior to storage in a storage system using a processing platform. An exemplary processing platform comprises one or more of a compute node and a burst buffer appliance. The processing platform communicates with a plurality of the compute nodes over a network, wherein a plurality of applications executing on the plurality of compute nodes generate a plurality of data objects; computes erasure metadata for one or more of the data objects on at least one of the compute nodes; and provides the erasure metadata with the corresponding one or more data objects to a storage system. The processing platform optionally determines a full set of the data objects to be stored and queries the storage system to determine an anticipated layout of the full set of the data objects to be stored. The anticipated layout allows special handling, for example, for small files and large files that are identified based on predefined criteria.

20 Claims, 10 Drawing Sheets

(56) References Cited

U.S. PATENT DOCUMENTS

2010/0094956 A1* 4/2010 Zuckerman ......... H04L 67/1097
709/219
2013/0227194 A1 8/2013 Kannan et al.
2016/0062834 A1* 3/2016 Benight ............. G06F 11/1076
714/766

OTHER PUBLICATIONS

Welch et al., "Scalable Performance of the Panasas Parallel File System", Proceedings of the 6th USENIX Conference on File and Storage Technologies (FAST '08) 2008.
Qureshi et al., "Primer and Recent Developments on Fountain Codes," BSP Recent Patents on Telecommunications (2013).
Lawrence Livermore National Laboratory, "Scalable Checkpoint Restart SCR User Manual", U.S. Department of Energy Contract DE-AC52-07NA27344, Sep. 28, 2015.

* cited by examiner

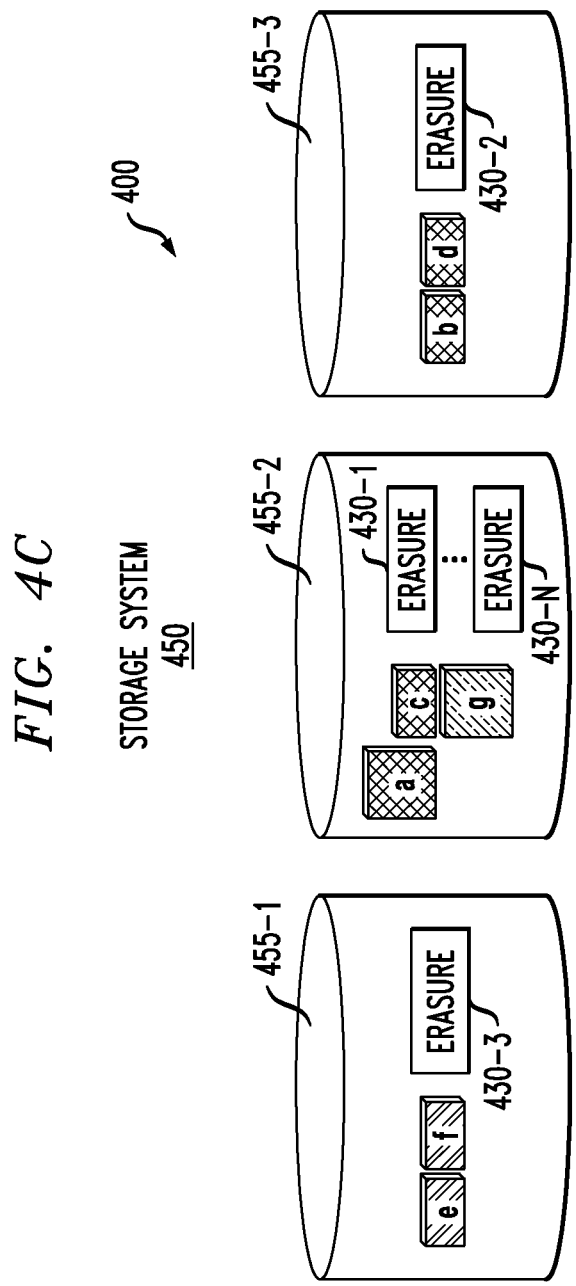

```
// Structure passed from application client to storage system to query eventual layout.
// Allows simultaneous description of multiple objects in one API call to
// avoid multiple network trips.
// This answers questions such as, if I were to write these objects to you, how would
their eventual layout look?
struct layout_query {
    int nobjs;       // number of objects being described
    int lengths[];   // size of each object
    int parents[];   // if applicable, depending on storage system, a parent could be a
directory identifier, a container identifier, or NULL
} layout_query_t;
```

```
// Structure by which storage system returns answer about eventual layout
// Implicitly this may lock underlying storage system in situations in which
// client will write directly to underlying storage systems.
struct layout_answer {
    int nobjs;              // number of objects being described
    striping_t stripings[]; // an array detailing stripings for each object
} layout_answer_t;
```

FIG. 5C

```
// Structure that describes layout for a single object
struct striping {
    int ndatadevices;        // number of devices across which to stripe object data
    int stripe_length;       // size of each stripe length
    enum stripe_algorithm;   // mechanism by which stripe is mapped to data devices (e.g.
Round-Robin although it could be more complex)
    int devices[];           // identifiers for each device
    int device_addresses[];  // addresses on each device to which data will be stored
    int parity_type;         // whether parity will be done by replication or by erasure
    void *erasure(char *buffer);  // a function pointer to the erasure algorithm if erasure is
parity mechanism
    int parity_devices[];    // identifiers for devices storing parity
    int parity_locations[];  // identifiers for locations on those devices into which parity
will be stored
    metadata_t metadata;     // an optional description to allow clients to do even more work in
terms of creating the metadata objects
} striping_t;
```
560

```
struct metadata {
    inode_t inode;           // a description of what storage i-nodes look like (e.g. man 2 stat)
    int inodes_per_block;    // a description of how many i-nodes to store into a contiguous
buffer
    int inode_map_block;     // an algorithm to describe how i-nodes are mapped to blocks
} metadata_t;
```
580

```
// Function by which client asks about eventual hypothetical data layout.
// And by which storage system returns answer.
// Note that this may implicitly lock the underlying system.
struct layout_answer_t query_layout(struct *layout_query);
```

```
// Function by which client tells server that data has been stored
// so that server can update its metadata (which may be passed if created by clients).
// Function reuses structure by which server told clients previously how to create layout.
// If storage system had locks earlier applied, they will be released now.
// If client participated in metadata packing as well as data packing, this info
// will also be provided at this time.
int layout_done(struct *layout_answer_t), struct metadata_t metadatas[]);
```

COMPUTING ERASURE METADATA AND DATA LAYOUT PRIOR TO STORAGE USING A PROCESSING PLATFORM

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

FIELD

The field relates generally to data storage and more particularly to techniques for generating parity in a large scale compute architecture.

BACKGROUND

Large scale compute architectures, such as high performance computing (HPC) supercomputers or cloud-based computing systems, typically have a set of compute nodes dedicated to compute functions and a storage system dedicated to storage functions. Almost universally, however, applications executing on the compute nodes can become blocked, and lose valuable compute time, while waiting for the storage system to preserve written data. The bottleneck for a storage system may be attributed, for example, to the computationally intensive tasks of creating parity metadata, such as erasure codes, and other metadata, especially for streamed data, as well as the latency of the storage media itself.

With computational capacities in compute nodes of large scale compute architectures approaching exascale, there are large amounts of computational capacity sitting idle on the compute nodes while the compute nodes wait for the storage system to complete input/output (IO) operations.

A need therefore exists for improved techniques for computing parity metadata, such as erasure codes, using computational capacities of the compute nodes. A further need exists for techniques for precomputing a data layout before the data is sent to the storage system that reorganizes application write data to better match performance characteristics of the storage system and for sending large data, even for multiple small files, in large pre-packaged byte-ranges to avoid subsequent reorganization by the storage system.

SUMMARY

Embodiments of the present invention provide improved techniques for computing data and metadata layout prior to storage in a storage system using a processing platform. In at least one exemplary embodiment, a processing platform comprises one or more of a compute node and a burst buffer appliance. The processing platform communicates with a plurality of the compute nodes over a network, wherein a plurality of applications executing on the plurality of compute nodes generate a plurality of data objects; computes erasure metadata for one or more of the data objects on at least one of the compute nodes; and provides the erasure metadata with the corresponding one or more data objects to a storage system.

In one exemplary embodiment, the processing platform determines a full set of the data objects to be stored and queries the storage system to determine an anticipated layout of the full set of the data objects to be stored. In addition, the processing platform optionally shuffles at least a portion of one or more of the data objects generated by at least one of the plurality of the compute nodes to one or more of the data objects generated by a second one of the plurality of the compute nodes based on the anticipated layout. The anticipated layout allows special handling, for example, for small files and large files that are identified based on predefined criteria.

In one or more embodiments, the processing platform is optionally configured to write one or more of the data objects directly to the storage system using a remote direct memory access (RDMA) operation.

Advantageously, illustrative embodiments of the invention compute parity metadata, such as erasure codes, using computational capacities of the compute nodes in a large scale parallel compute architecture. Metadata processing operations in accordance with aspects of the present invention reduce the amount of time that compute nodes will wait for the storage system to complete IO operations.

These and other features and advantages of the present invention will become more readily apparent from the accompanying drawings and the following detailed description.

BRIEF DESCRIPTION OF THE DRAWINGS

FIGS. 4A through 4C, collectively, illustrate the generation and storage of data and corresponding metadata in a large scale compute architecture incorporating aspects of the present invention;

FIGS. 5A through 5C provide exemplary pseudo code for a number of data structures employed by various embodiments of the invention;

FIGS. 6A and 6B provide exemplary pseudo code for a number of functions employed by various embodiments of the invention.

DETAILED DESCRIPTION

Illustrative embodiments of the present invention will be described herein with reference to an exemplary large scale compute architecture and associated compute nodes, storage systems, applications and other processing devices. It is to be appreciated, however, that the invention is not restricted to use with the particular illustrative large scale compute architecture and device configurations shown. Accordingly, the term "large scale compute architecture" as used herein is intended to be broadly construed, so as to encompass, for example, large HPC supercomputers and cloud-based computing and storage systems.

As indicated above, one challenge in a large scale compute architecture when a plurality of distributed processes write data, is the amount of metadata that must be generated, stored and processed by the storage system. According to one aspect of the invention, techniques are provided for computing parity metadata, such as erasure codes, using computational capacities of the compute nodes in a large scale compute architecture.

According to another aspect of the invention, techniques are provided for precomputing a data layout before the data is sent to the storage system that reorganizes application write data to better match performance characteristics of the storage system. In this manner, applications can pack the data for many small files, for example, into the same arrangement that the storage system would use if the small files were sent sequentially to the storage system. In addition, applications can create the metadata for these small files and send many small files in a single batch to the storage system. In this manner, in the case of small files, applications have a faster mechanism for storing data in the storage system without requiring a request for each small file.

Large files typically end up striped across multiple storage devices. In the case of large files, the layout indicates what the striping will look like in the storage system. Thus, if applications have the anticipated layout in advance of sending the large files to the storage system, each application can write a portion of the large file based on the layout and indicate to the storage system that the portions are part of a large file.

In at least one exemplary embodiment, small files are distinguished from large files using a size threshold based on, for example, the page size of the file system and/or the client operating system. For example, a file system page size may be, e.g., 4 Kbytes or 64 Kbytes, and any files smaller than the established page size may be characterized as small files.

According to yet another aspect of the invention, applications can write directly to underlying storage media, for example, using a remote direct memory access (RDMA). Thereafter, the applications can inform the storage system that new files (or objects) have been stored in the storage system.

Figure 1:
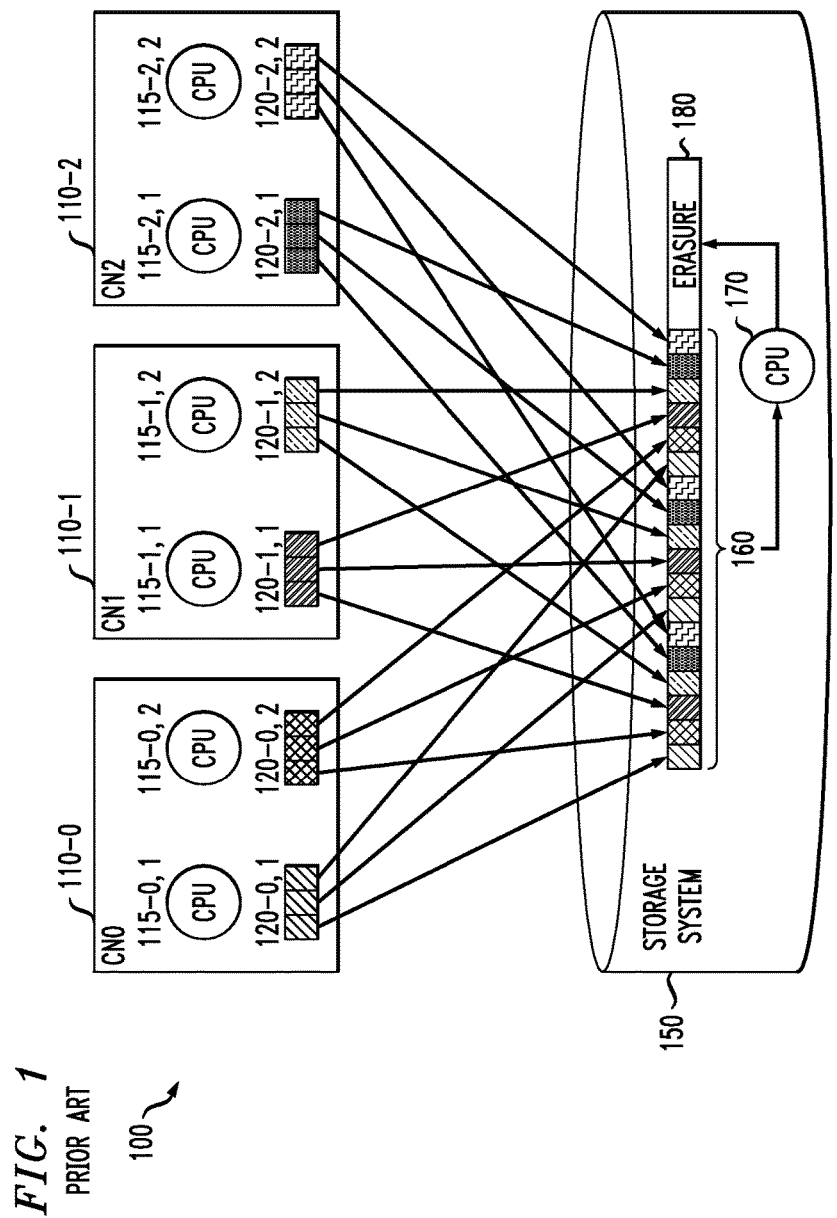
FIG. 1 illustrates an exemplary conventional large scale compute architecture.

FIG. 1 illustrates an exemplary conventional large scale compute architecture 100. The exemplary conventional large scale compute architecture 100 comprises a plurality of compute nodes (CNs) 110-0 through 110-2 and a storage system 150. A plurality of applications execute on central processing units (CPU) 115-0,1 through 115-2,2 of the plurality of compute nodes 110. The applications generate data 120-0,1 through 120-2,2 and write the data 120-0,1 through 120-2,2 to the storage system 150. It is noted that the first index for the CPUs 115 and the data 120 indicates the associated compute node 110 (i.e., CN0, CN1 or CN2 in the exemplary embodiment of FIG. 1) and the second index for the CPUs 115 and the data 120 differentiates among the various CPUs 115 or data 120 on a given compute node 110.

The storage system 150 comprises one or more storage devices (not shown). The storage devices in the storage system 150 may optionally be arranged into a plurality of storage tiers, in a known manner. Storage arrays utilized in the storage system 150 may comprise, for example, storage products such as VNX® and Symmetrix® VMAX®, both commercially available from EMC Corporation of Hopkinton, Mass. A variety of other storage products may be utilized to implement at least a portion of the object storage targets of the parallel file system 100.

One or more of the devices in FIG. 1 comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein may be viewed as examples of what are more generally referred to as "computer program products" storing executable computer program code. Also included in one or more of the devices in FIG. 1 is network interface circuitry. The network interface circuitry allows the devices to communicate over the network with compute nodes 110 and/or storage system 150. The network interface circuitry may comprise, for example, one or more conventional transceivers.

The compute nodes 110 and storage system 150 communicate with one another, for example, over a network (not shown). The network may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

The file system in the large scale compute architecture 100 may be implemented, by way of example, in the form of a Lustre file system, although use of Lustre is not a requirement of the present invention. Accordingly, storage devices in the storage system 150 need not be configured with Lustre functionality, but may instead represent elements of another type of cluster file system. Additional details regarding conventional aspects of an exemplary Lustre file system may be found in, for example, Cluster File Systems, Inc., "Lustre: A Scalable, High-Performance File System," November 2002, pp. 1-13, and F. Wang et al., "Understanding Lustre Filesystem Internals," Tech. Report ORNL/TM-2009/117, April 2009, pp. 1-95, which are incorporated by reference herein. Additional details regarding the optional use of a parallel log structured file system (PLFS) on compute nodes 110 may be found in, for example, John Bent et al., "PLFS: A Checkpoint Filesystem for Parallel Applications," Intl Conf. for High Performance Computing, Networking, Storage and Analysis 2009 (SC09) (November 2009), incorporated by reference herein.

The compute nodes 110 can concurrently access the collective data storage capacity of the storage system 150 using data IO requests directed to the storage devices in the storage system 150. The IO requests and other similar requests herein may be configured, for example, in accordance with standard portable operating system interface (POSIX) system calls.

As noted above, the applications generate data 120 and write the data 120 to the storage system 150 as collective stored data 160. It is noted that the collective stored data 160 may be spread across multiple nodes of the storage system 150, but is shown in FIG. 1 as a single data unit for ease of illustration. When the collective stored data 160 is written to the storage system 150, the storage system 150 also creates erasure metadata 180 for the collective stored data 160 using a CPU 170 of the storage system 150.

For example, in some existing storage systems, this metadata creation creates a 5.3× write amplification. The amplification is due to the fact that incoming data is first triplicated (3×). Asynchronously, it is read (1×) and then rewritten (1×) into an erasure layout augmented by erasure data 180 which is about 30% of the size of the data (0.3×).

The erasure metadata 180 comprises, for example, the result of well-known algorithms applied to the stored bits. The erasure metadata 180 allows missing bits in the larger original data to be recreated.

As noted above, the applications executing on the compute nodes 110 can become blocked, and lose valuable compute time, while waiting for the storage system 150 to preserve written data. Aspects of the present invention recognize that with computational capacities in compute nodes 110 of existing large scale compute architectures 100 approaching exascale, there are large amounts of computational capacity sitting idle on the compute nodes 110 while the compute nodes 110 wait for the storage system 150 to complete the input/output (IO) operations.

These and other drawbacks of conventional arrangements are addressed by aspects of the present invention by computing the erasure metadata and optionally additional parity metadata using computational capacities of the compute nodes 110 in a large scale compute architecture.

Figure 2:
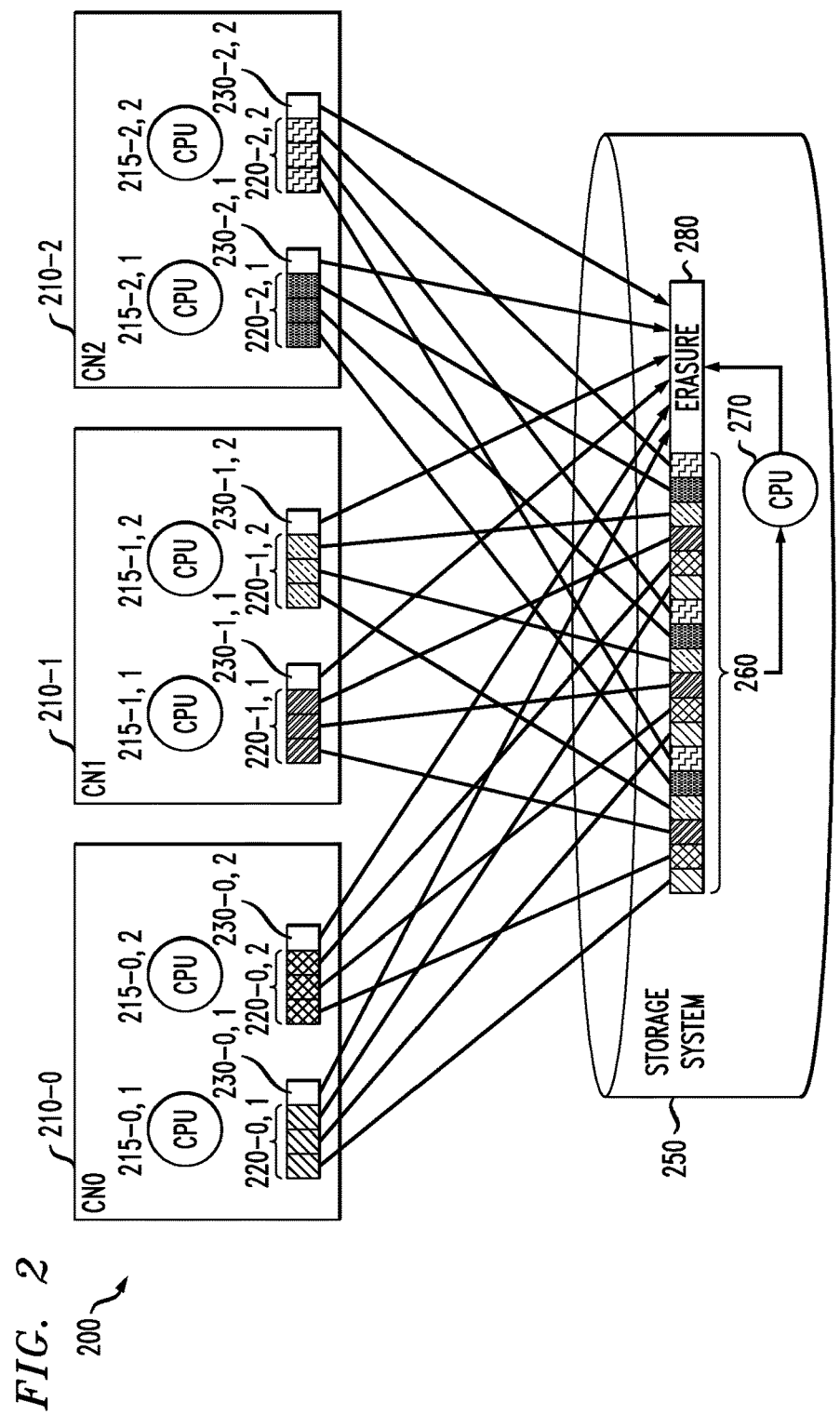
FIG. 2 illustrates a large scale compute architecture in accordance with one or more embodiments of the invention.

FIG. 2 illustrates a large scale compute architecture 200 in accordance with aspects of the invention. As shown in FIG. 2, the exemplary large scale compute architecture 200 comprises a plurality of compute nodes (CNs) 210-0 through 210-2 and a storage system 250, in a similar manner to FIG. 1. A plurality of applications execute on CPUs 215-0,1 through 215-2,2 of the plurality of compute nodes 210. The applications generate data 220-0,1 through 220-2,2 and write the data 220-0,1 through 220-2,2 to the storage system 250, again in a similar manner to FIG. 1.

As noted above, in at least one embodiment of the invention, the erasure metadata and optionally additional parity metadata are computed using computational capacities of the compute nodes 210 in large scale compute architecture 200. Thus, in the embodiment of FIG. 2, the applications generate their respective data 220-0,1 through 220-2,2, as well as the corresponding erasure metadata 230-0,1 through 230-2,2 using CPUs 215-0,1 through 215-2,2. Thereafter, the applications write the data 220 and corresponding erasure metadata 230 to the storage system 250 as collective stored data 260 and collective erasure metadata 280. It is again noted that the collective stored data 260 and collective erasure metadata 280 may be spread across multiple nodes of the storage system 250, but is shown in FIG. 2 as a single data unit for ease of illustration.

As discussed further below in conjunction with FIGS. 4A-4C and 6A-6B, in at least one exemplary embodiment, one or more application clients in the large scale compute architecture 200 of FIG. 2 can query the storage system 250 to determine, in advance, what the data layout would look like before the data is actually sent to the storage system 250. In addition, the storage system 250 can optionally provide guidance on how the erasure metadata would be computed. In this manner, applications can compute the erasure metadata itself, pack the computed erasure metadata with the data, and send the packed data and corresponding erasure metadata to the storage system 250.

The storage system 250 optionally includes a CPU 270, but it is not used for the computation of erasure metadata in the embodiment of FIG. 2.

Figure 3:
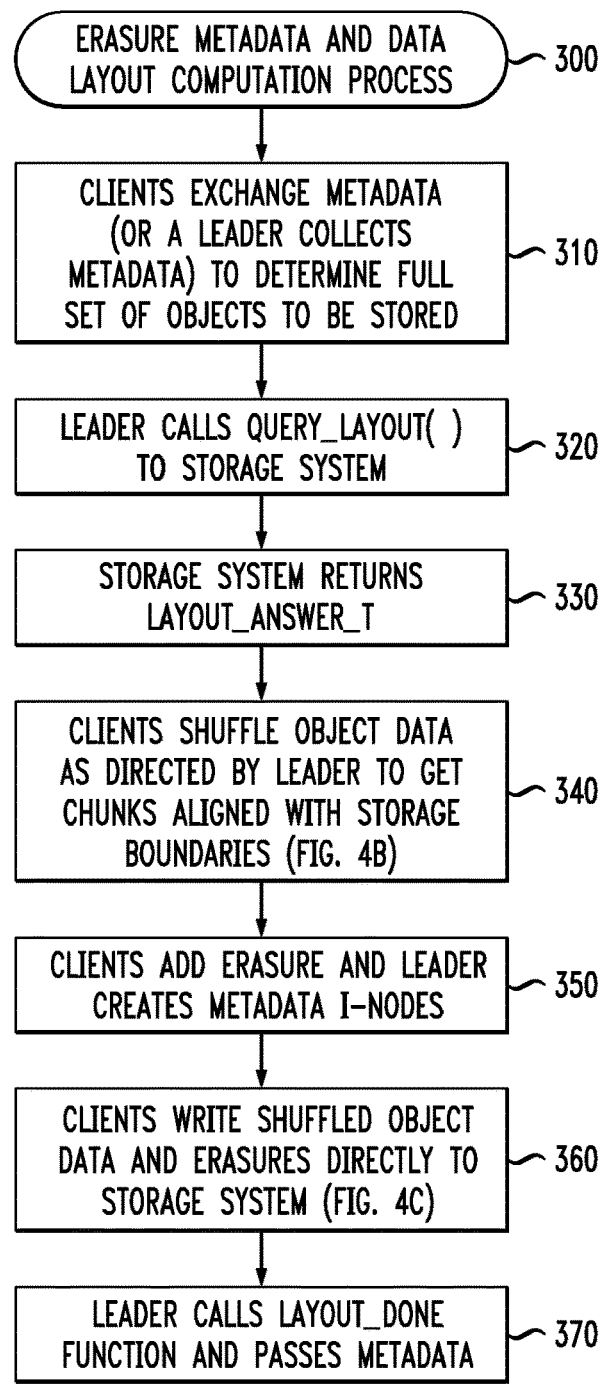
FIG. 3 is a flow chart illustrating an exemplary implementation of an erasure metadata and data layout computation process 300 according to one embodiment of the invention.

FIG. 3 is a flow chart illustrating an exemplary implementation of an erasure metadata and data layout computation process 300 according to one embodiment of the invention. As shown in FIG. 3, during step 310 of the exemplary erasure metadata and data layout computation process 300, clients initially exchange metadata (or a client leader collects metadata) to determine full set of data objects to be stored.

Thereafter, the client leader calls a query_layout( ) function, as discussed further below in conjunction with FIG. 6A, during step 320 to the storage system 250, and the storage system 250 returns the layout in layout_answer_t during step 330.

The clients shuffle (i.e., exchange) object data as directed by the client leader to get chunks that are aligned with storage boundaries, as discussed further below in conjunction with FIG. 4B, during step 340. The clients compute and add the erasure metadata during step 350 and the client leader optionally creates the metadata i-nodes, for example, when the applications produce a large numbers of small files. Then, these i-nodes and other associated metadata can be consumed in a large batch by the storage system 250.

The clients write the shuffled object data and corresponding erasure metadata directly to the storage system 250 during step 360, as discussed further below in conjunction with FIG. 4C. In one variation, the clients do not send the erasure metadata directly to the storage system 250, but rather provide the erasure metadata to the client leader, who includes the erasure metadata in additional metadata 440 (discussed in the following step and further below in conjunction with FIG. 4B).

The client leader calls a layout_done function, as discussed further below in conjunction with FIG. 6B, and passes metadata 440 (discussed further below in conjunction with FIG. 4B) to the storage system 250 during step 370.

Figure 4A:
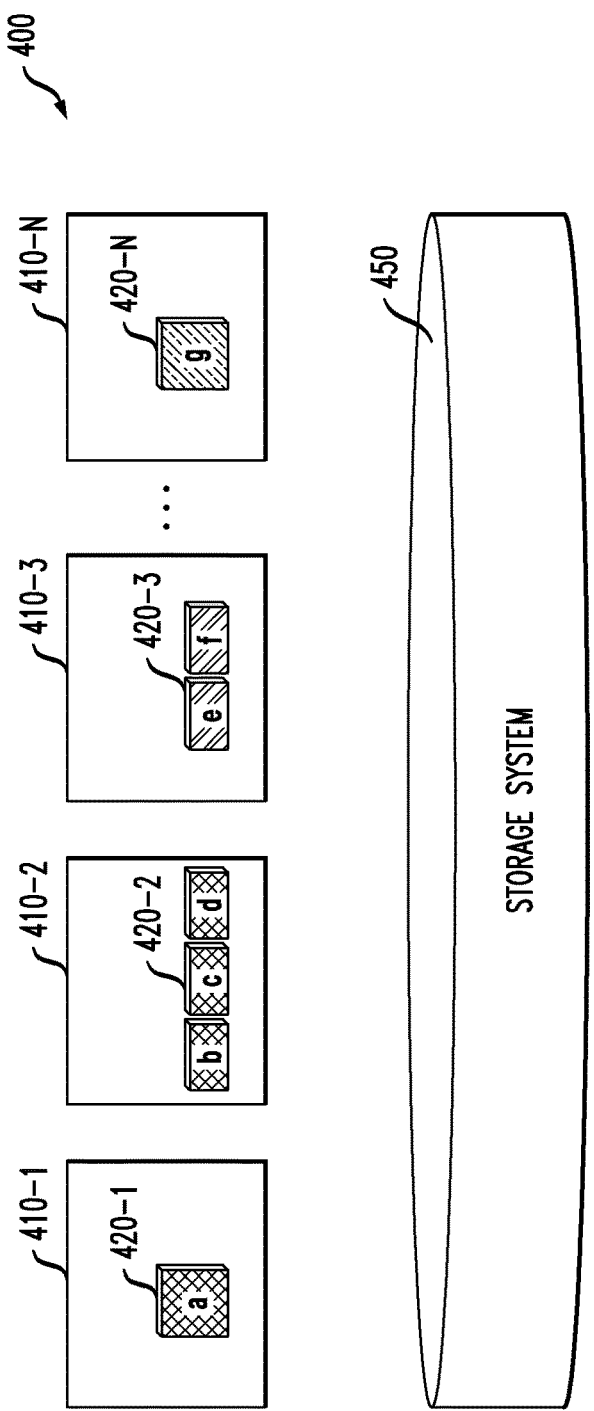
Figure 4B:
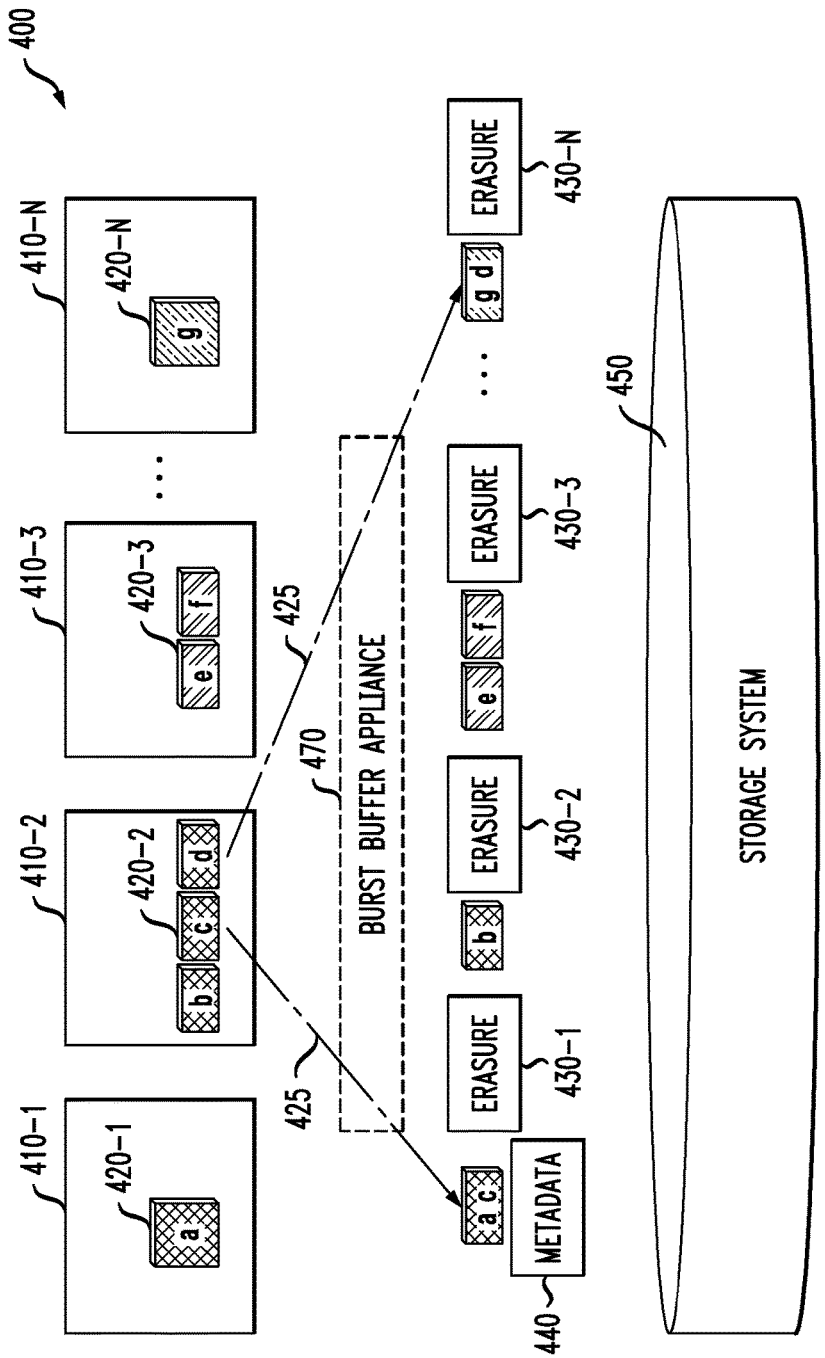

FIGS. 4A through 4C, collectively, illustrate the generation of data and corresponding metadata by a plurality of applications executing on a plurality of compute nodes 410-1 through 410-N in a large scale compute architecture 400, and the storage of such data and corresponding metadata in a storage system 450. As shown in FIG. 4A, a plurality of applications executing on a plurality of compute nodes 410-1 through 410-N generate a plurality of data objects 420-1 through 420-N to be stored in the storage system 450. In the example of FIG. 4A, the application on compute node 410-1 generates one data object (a) 420-1, the application on compute node 410-2 generates three data objects (b, c, d) 420-2, the application on compute node 410-3 generates two data objects (e, f) 420-3, and the application on compute node 410-N generates one data object (g) 420-N.

In addition, as discussed above in conjunction with FIG. 3, the application clients exchange metadata (or a client leader collects metadata) to determine the full set of data objects to be stored in the storage system 450 (step 310 of FIG. 3); the client leader calls a query_layout( ) function (FIG. 6A) (step 320 of FIG. 3) to the storage system 250; and the storage system 250 returns the layout in layout_answer_t (step 330 of FIG. 3).

As shown in FIG. 4B, the application clients shuffle (i.e., exchange) object data (e.g., by communications 425) as directed by the client leader to obtain chunks that are aligned with storage boundaries (step 340 of FIG. 3). For example, compute node 410-2 sends data object (c) to compute node 410-1 and compute node 410-2 sends data object (d) to compute node 410-N. The application clients compute the erasure metadata 430 for the shuffled objects (step 350 of FIG. 3). Following the shuffling, the clients compute the erasure metadata 430 during step 350 (FIG. 3) for the shuffled data objects that remain on the respective compute node 410. For example, the application client executing on compute node 410-1 computes the erasure metadata 430-1 for the shuffled data objects (a, c).

In the exemplary embodiment of FIG. 4B, the client executing on compute node 410-1 is the client leader discussed above in conjunction with FIG. 3. As noted above, the client leader passes metadata 440 to the storage system 450. The metadata 440 comprises, for example, the actual layout information received from the storage system 450, or an identifier of the layout information received from the storage system 450; optional parity information, and optional traditional metadata, such as filename, file creation timestamp, and file permissions.

As shown in FIG. 4C, the application clients write the shuffled object data and corresponding erasure metadata 430 directly to the storage system 450 (step 360 of FIG. 3). In the exemplary embodiment of FIG. 4C, the storage system 450 comprises three storage arrays 455-1 through 455-3 and the shuffled object data and corresponding erasure metadata 430 are spread among the three storage arrays 455.

In one variation shown in FIG. 4B, the application clients on each compute node 410 can provide the generated data objects 420 to one or more optional burst buffer appliances 470. The one or more optional burst buffer appliances 470 can then perform one or more of the client tasks of the erasure metadata and data layout computation process 300, discussed above in conjunction with FIG. 3 (including obtaining the layout in steps 310-330, shuffling the object data accordingly in step 340, creating the erasure metadata in step 350 and writing the data and associated erasure metadata to the storage system 450 in step 360). The burst buffer appliance 470 in the present embodiment is assumed to comprise a flash memory or other high-speed memory having a substantially lower access time than storage tiers in the storage system 450. The burst buffer appliance 470 may optionally comprise an analytics engine, and may include other components.

Although flash memory will often be used for the high-speed memory of the burst buffer appliance 470, other types of low-latency memory could be used instead of flash memory. Typically, such low-latency memories comprise electronic memories, which may be implemented using non-volatile memories, volatile memories or combinations of non-volatile and volatile memories. Accordingly, the term "burst buffer appliance" as used herein is intended to be broadly construed, so as to encompass any network appliance or other arrangement of hardware and associated software or firmware that collectively provides a high-speed memory and optionally an analytics engine to control access to the high-speed memory. Thus, such an appliance includes a high-speed memory that may be viewed as serving as a buffer between a computer system comprising clients executing on compute nodes 410 and a storage system 450 having a file system, for storing bursts of data associated with different types of IO operations.

FIGS. 5A through 5C provide exemplary pseudo code for a number of data structures 500, 530, 560 and 580 employed by various embodiments of the invention. As shown in FIG. 5A, a layout_query data structure 500 is passed from an application client to the storage system 250 to query, in advance, for the eventual layout. The layout_query data structure 500 allows simultaneous description of multiple objects in one API call to avoid multiple network trips. The exemplary layout_query data structure 500 describes a number of objects being described; a size of each object; and a parent, if applicable (depending on the storage system 250, a parent could be a directory identifier, a container identifier, or NULL).

As shown in FIG. 5B, a layout_answer data structure 530 is used by the storage system 250 to return an answer about the eventual layout. The layout_answer data structure 530 may implicitly lock the underlying storage system 250 in situations in which the application client will write directly to the underlying storage system 250. The exemplary layout_answer data structure 530 indicates a number of objects being described, and an array detailing the stripings for each object.

As shown in FIG. 5C, a striping data structure 560 describes the layout for a single object. The exemplary striping data structure 560 indicates a number of devices across which to stripe the object data; a size of each stripe length; a mechanism by which stripe is mapped to data devices (e.g. Round-Robin although it could be more complex); identifiers for each device; addresses on each device to which data will be stored; whether parity will be done by replication or by erasure; a function pointer to the erasure algorithm if erasure is parity mechanism; identifiers for devices storing parity; identifiers for locations on those devices into which parity will be stored; and an optional description to allow clients to do even more work in terms of creating the metadata objects.

In addition, an exemplary metadata data structure 580 includes a description of what storage i-nodes look like (e.g. man 2 stat); a description of how many i-nodes to store into a contiguous buffer; and an algorithm to describe how i-nodes are mapped to blocks.

FIGS. 6A and 6B provide exemplary pseudo code for a number of functions 600 and 650 employed by various embodiments of the invention. As noted above, the client leader calls a query_layout( ) function, shown in FIG. 6A, during step 320 of the erasure metadata and data layout computation process 300 (FIG. 3), to the storage system 250, and the storage system 250 returns the layout in layout_answer_t during step 330 (FIG. 3).

As shown in FIG. 6A, the query_layout( ) function 600 allows a client to query the storage system 250, in advance, about the eventual hypothetical data layout of data to be stored in the storage system 250. The storage system 250 determines the layout using existing techniques of commercially available storage systems. In addition, the storage system 250 returns the answer using the layout_answer data structure 530 (FIG. 5B).

As noted above, the client leader calls a layout_done function, shown in FIG. 6B, and passes metadata 440 (FIG. 4B) to the storage system 250 during step 370 of the erasure metadata and data layout computation process 300 (FIG. 3). As shown in FIG. 6B, the exemplary layout_done function 650 allows clients to tell the storage system 250 (e.g., a server) that data has been stored in the storage system 250 so that the server can update its metadata (which may be passed if created by clients).

The exemplary layout_done function 650 reuses structure by which the server told clients previously how to create the layout. If the storage system 250 had locks applied earlier, the locks will be released at this time. If a client participated in metadata packing as well as data packing, this information will also be provided at this time.

CONCLUSION

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

It is to be appreciated that the particular operations and associated messaging illustrated in FIGS. 3 and 4A-4C are exemplary only, and numerous other types of operations and messaging may be used in other embodiments. It should therefore be understood that in other embodiments different arrangements of additional or alternative elements may be used. At least a subset of these elements may be collectively implemented on a common processing platform, or each such element may be implemented on a separate processing platform.

As indicated previously, components of a compute node 210, components of a burst buffer appliance 470 or components of the storage system 250 as disclosed herein can be implemented at least in part in the form of one or more software programs stored in memory and executed by a processor of a processing device. A memory having such program code embodied therein is an example of what is more generally referred to herein as a "computer program product."

Figure 7:
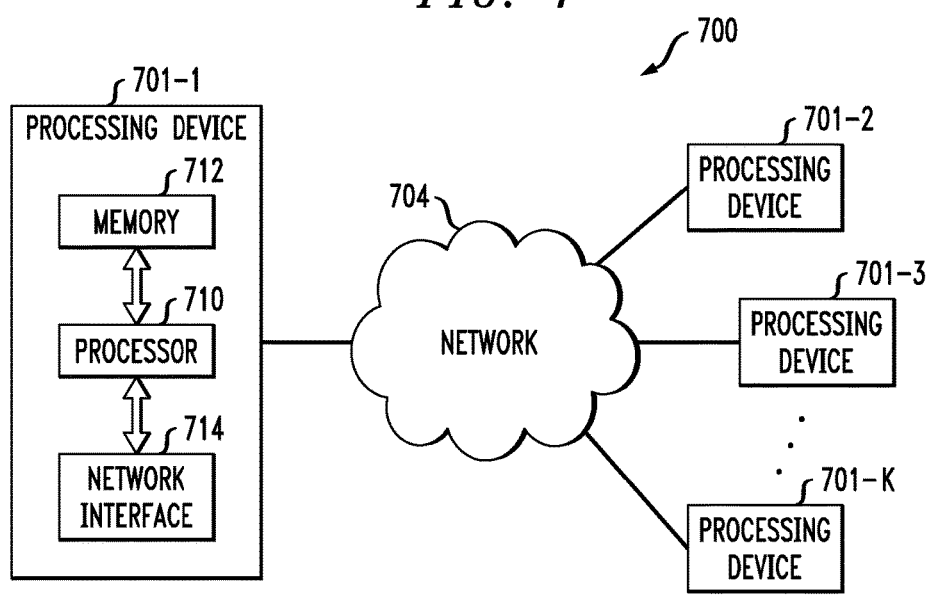
FIG. 7 illustrates an exemplary processing platform in which aspects of the present invention can be employed.

FIG. 7 illustrates an exemplary processing platform in which aspects of the present invention can be employed. The exemplary processing platform 700 comprises a plurality of processing devices, denoted 701-1, 701-2, 701-3, ... 701-K, that communicate with one another over a network 704. The network 704 may comprise any type of network, such as a WAN, a LAN, a satellite network, a telephone or cable network, or various portions or combinations of these and other types of networks.

The processing device 701-1 in the processing platform 700 comprises a processor 710 coupled to a memory 712. The processor 710 may comprise a microprocessor, a microcontroller, an application-specific integrated circuit (ASIC), a field-programmable gate array (FPGA) or other type of processing circuitry, as well as portions or combinations of such circuitry elements, and the memory 712, which may be viewed as an example of a "computer program product" having executable computer program code embodied therein, may comprise random access memory (RAM), read-only memory (ROM) or other types of memory, in any combination.

Also included in the processing device 701-1 is network interface circuitry 714, which is used to interface the processing device with the network 704 and other system components, and may comprise conventional transceivers.

The other processing devices 701 of the processing platform 700 are assumed to be configured in a manner similar to that shown for processing device 701-1 in the figure.

Again, the particular processing platform 700 shown in FIG. 7 is presented by way of example only, and system 100 may include additional or alternative processing platforms, as well as numerous distinct processing platforms in any combination, with each such platform comprising one or more computers, servers, storage devices or other processing devices.

It should again be emphasized that the above-described embodiments of the invention are presented for purposes of illustration only. Many variations and other alternative embodiments may be used. For example, the techniques are applicable to a wide variety of other types of devices and systems that can benefit from the erasure metadata and data layout computation techniques disclosed herein. Also, the particular configuration of system and device elements shown in FIGS. 2 and 4A-4C can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a processing platform comprising a compute node;
the processing platform being configured to communicate with a plurality of said compute nodes over a network, wherein a plurality of applications executing on said plurality of compute nodes generate a plurality of data objects;
the processing platform further configured to compute erasure metadata for one or more of said data objects on at least one of said compute nodes and to provide said erasure metadata with said corresponding one or more data objects to a storage system.

2. The apparatus of claim 1 wherein said processing platform is further configured to determine a full set of said data objects to be stored.

3. The apparatus of claim 2 wherein said processing platform is further configured to query said storage system to determine an anticipated layout of said full set of said data objects to be stored.

4. The apparatus of claim 3 wherein said processing platform is further configured to shuffle at least a portion of one or more of said data objects generated by at least one of said plurality of compute nodes to a second one of said plurality of compute nodes based on said anticipated layout.

5. The apparatus of claim 3 wherein said data objects comprise small files and wherein said processing platform is further configured to aggregate a plurality of said data objects based on said anticipated layout, wherein said small files are identified based on a predefined size threshold.

6. The apparatus of claim 5 wherein said processing platform is further configured to create metadata for said aggregated plurality of said data objects and to provide said aggregated plurality of said data objects and said corresponding metadata to said storage system in a single batch operation.

7. The apparatus of claim 3 wherein at least one of said data objects comprise a large file and wherein said processing platform is further configured to write a portion of the large file to the storage system based on the anticipated layout and indicate to the storage system that the portion is a part of said large file, wherein said large file is identified based on a predefined size threshold.

8. The apparatus of claim 1 wherein said processing platform is further configured to write one or more of said data objects directly to said storage system using a remote direct memory access (RDMA) operation.

9. A method comprising:
configuring a processing platform to communicate with a plurality of compute nodes over a network, wherein a plurality of applications executing on said plurality of compute nodes generate a plurality of data objects, wherein said processing platform comprises one of said compute nodes; and
configuring the processing platform to compute erasure metadata for one or more of said data objects on at least one of said compute nodes and to provide said erasure metadata with said corresponding one or more data objects to a storage system.

10. The method of claim 9 further comprising the step of configuring said processing platform to determine a full set of said data objects to be stored.

11. The method of claim 10 further comprising the step of configuring said processing platform to query said storage system to determine an anticipated layout of said full set of said data objects to be stored.

12. The method of claim 11 further comprising the step of configuring said processing platform to shuffle at least a portion of one or more of said data objects generated by at least one of said plurality of said compute nodes to one or more of said data objects generated by a second one of said plurality of compute nodes based on said anticipated layout.

13. The method of claim 11 wherein said data objects comprise small files and wherein said processing platform is further configured to aggregate a plurality of said data objects based on said anticipated layout, wherein said small files are identified based on a predefined size threshold.

14. The method of claim 13 further comprising the step of configuring said processing platform to create metadata for said aggregated plurality of said data objects and to provide said aggregated plurality of said data objects and said corresponding metadata to said storage system in a single batch operation.

15. The method of claim 11 wherein at least one of said data objects comprise a large file and wherein said processing platform is further configured to write a portion of the large file to the storage system based on the anticipated layout and indicate to the storage system that the portion is a part of said large file, wherein said large file is identified based on a predefined size threshold.

16. The method of claim 9 further comprising the step of configuring said processing platform to write one or more of said data objects directly to said storage system using a remote direct memory access (RDMA) operation.

17. A computer program product comprising a non-transitory processor-readable storage medium having encoded therein executable code of one or more software programs, wherein the one or more software programs when executed perform the steps of the method of claim 9.

18. A compute architecture comprising:
a plurality of compute nodes;
a storage system; and
a processing platform comprising one of said compute nodes;
the processing platform being configured to communicate with a plurality of said compute nodes over a network, wherein a plurality of applications executing on said plurality of compute nodes generate a plurality of data objects;
the processing platform further configured to compute erasure metadata for one or more of said data objects on at least one of said compute nodes and to provide said erasure metadata with said corresponding one or more data objects to the storage system.

19. The compute architecture of claim 18 wherein said processing platform is further configured to query said storage system to determine an anticipated layout of said full set of said data objects to be stored.

20. The compute architecture of claim 18 wherein said processing platform is further configured to write one or more of said data objects directly to said storage system using a remote direct memory access (RDMA) operation.

* * * * *